United States Patent [19]

Alexander

[11] Patent Number: 4,634,538

[45] Date of Patent: Jan. 6, 1987

[54] WATER SWELLABLE CLAY COMPOSITION AND METHOD TO MAINTAIN STABILITY IN SALT CONTAMINATED WATER

[75] Inventor: William Alexander, Naperville, Ill.

[73] Assignee: American Colloid Company, Skokie, Ill.

[21] Appl. No.: 749,663

[22] Filed: Jun. 28, 1985

Related U.S. Application Data

[63] Continuation of Ser. No. 640,680, Aug. 13, 1984, abandoned.

[51] Int. Cl.$^4$ .................. C09K 7/02; E02D 3/12
[52] U.S. Cl. .................. 252/8.514; 252/315.2; 252/8.51; 405/264
[58] Field of Search ............ 252/315.2, 315.3, 8.5 A, 252/8.5 C, 8.5 LC

[56] References Cited

U.S. PATENT DOCUMENTS

| | | | |
|---|---|---|---|
| 2,260,882 | 10/1941 | Berg | 106/209 |
| 2,948,678 | 8/1960 | Turner et al. | 252/8.5 |
| 3,018,245 | 1/1962 | Owen | 252/8.5 |
| 3,081,260 | 3/1963 | Park | 252/8.5 |
| 3,198,268 | 8/1965 | Lindblom et al. | 252/8.5 X |
| 3,251,768 | 5/1966 | Walker | 252/8.5 |
| 3,557,016 | 1/1971 | Schuppner | 252/315.3 |
| 3,765,918 | 10/1973 | Jordan et al. | 252/8.5 X |
| 3,909,421 | 9/1975 | Gaddis | 166/275 X |
| 4,105,461 | 8/1978 | Racciato | 106/205 |

FOREIGN PATENT DOCUMENTS 56-18683  2/1981  Japan ......................... 252/8.5

*Primary Examiner*—Herbert B. Guynn
*Attorney, Agent, or Firm*—Mason, Kolehmainen, Rathburn & Wyss

[57] ABSTRACT

Disclosed is a composition including a water swellable clay, and particularly a montmorillonite clay, such as bentonite; xanthan gum; and one or more additional water-soluble gums, for example, guar dextran, acacia or locust bean. The xanthan gum together with one or more additional water-soluble gums prevents montmorillonite clay composition from substantial coagulation or flocculation upon contact with salt contaminated water even in high concentrations of, for example, 15-40% by weight salt. It has been found that xanthan gum in an amount of 0.1-20% based on the weight of the water-swellable clay, i.e. bentonite, in the composition together with one other water soluble gum, for example guar gum, dextran gum, acacia gum and/or locust bean gum in an amount of 1.0-10% based on the weight of bentonite in the composition will provide a clay composition capable of excellent stability without component separation in salt contaminated water. The composition is particularly useful as an additive to compositions used as stable drilling fluids in rotary drilling, and as lagoon and landfill sealants.

4 Claims, No Drawings

WATER SWELLABLE CLAY COMPOSITION AND METHOD TO MAINTAIN STABILITY IN SALT CONTAMINATED WATER

CROSS REFERENCE TO RELATED APPLICATION

This application is a continuation of copending application Ser. No. 640,680, filed Aug. 13, 1984, now abandoned.

FIELD OF THE INVENTION

The present invention relates to water swellable clay additives including xanthan gum and at least one other water soluble gum, for example, guar, dextran, acacia, or locust bean which, when combined with a water swellable colloidal clay, such as bentonite clay, permits the clay composition to remain stable with substantially improved suspending properties in salt contaminated water.

BACKGROUND OF THE INVENTION AND PRIOR ART

It is well known that the montmorillonite group of clays hydrate and swell in fresh water but the swelling is substantially inhibited in salt contaminated water. Salt contaminated water is often encountered in the environments of use of bentonite clays where bentonite is advantageously employed for its swelling capacity, for example, as an additive in drilling muds for the purpose of sealing fissures in earthen formations surrounding the drill hole to prevent loss of drilling fluid; and in the sealing of lagoons and landfills. When contacted with salt contaminated water, the swelling capacity and stability of common montmorillonite clays is severely inhibited making it necessary to use much greater quantities of the clay to achieve the degree of swelling needed for sealing purposes. In some cases the palygorskite clays are used instead of the montmorillonite clays because of their better dispersing properties in salt water, as disclosed in U.S. Pat. No. 4,202,413.

In the past, modified bentonite clays have been developed by this assignee having a swelling capacity substantially uninhibited in salt water. Examples of such modified bentonites are the polymer treated bentonites disclosed in the Clem U.S. Pat. Nos. 3,949,560, 4,021,402, 4,048,373 and 4,103,499.

The present invention is directed to montmorillonite clay compositions including gum additives capable of permitting water swellable montmorillonite clays to seal against permeability in earthen formations when used in drilling fluids and for water sealing in lagoons and landfills when contacted by salt water. Others have added various gums to bentonite compositions for achieving desired viscosities, as disclosed in the following patents, but none of these patents discloses applicant's composition and none teaches that the composition disclosed herein permits montmorillonite clays to remain stable without component separation when used in a salt water environment: Harris U.S. Pat. No. 1,498,269; Wallace U.S. Pat. Nos. 1,955,936 and 2,287,183; Berg U.S. Pat. No. 2,260,882; Parsons U.S. Pat No. 2,294,012; Jeanneret U.S. Pat. No. 3,275,460; Gropis U.S. Pat. No. 3,909,421; Brewer U.S. Pat. No. 3,921,581; Piunguian U.S. Pat. No. 3,989,534; and Messenger U.S. Pat. No. 4,202,413.

SUMMARY OF THE INVENTION

In brief, the present invention is directed to a composition including a water swellable clay and particularly a montmorillonite clay, such as bentonite; xanthan gum; and one or more additional water-soluble gums, for example, guar, dextran, acacia or locust bean. The xanthan gum together with one or more additional water-soluble gums prevents the clay from settling from the composition when contacted with salt contaminated water even in high concentrations of, for example, 15-40% by weight salt. The stability of the composition is unexpected with both xanthan gum and another water soluble gum when the xanthan and another gum are included in the composition in proper quantities. It has been found that xanthan gum in an amount of 0.1-20% based on the weight of of the water-swellable montmorillonite clay, i.e. bentonite, in the composition together with at least one other water soluble gum, for example guar gum, dextran gum, acacia gum and/or locust bean gum in a total amount of 1.0-10% based on the weight of bentonite in the composition will provide a bentonite composition capable of synergistic stability in salt contaminated water. The composition is particularly useful as an additive to water-swellable clay compositions used in rotary drilling as drilling fluids and in lagoon and landfill sealants.

Accordingly, an object of the present invention is to provide a water-swellable montmorillonite clay composition capable of unexpected stability when in contact with salt contaminated water.

Another object of the present invention is to provide additives for a bentonite composition which, when added to bentonite, enable the bentonite to remain unexpectedly stable when contacted with salt contaminated water.

Another object of the present invention is to provide a montmorillonite clay composition comprising a water swellable montmorillonite clay, xanthan gum in an amount of 0.1-20% based on the weight of montmorillonite clay, and at least one other water soluble gum, such as guar gum in an amount of 1-10% based on the weight of clay to provide a new and improved earthen formation clay composition capable of formation permeability sealing properties when used in a salt water contaminated environment.

Another object of the present invention is to provide a method of rotary drilling including the step of circulating a new and improved bentonite composition within the drill hole as a rotary drilling fluid additive to seal an earthen formation surrounding the drill hole wherein the bentonite composition includes bentonite, xanthan gum and at least one other water soluble gum whereby contact of the drilling fluid with salt contaminated water does not substantially inhibit the water-sealing properties of the bentonite within the drilling fluid.

Another object of the present invention is to provide a method of holding water such as in a lagoon bottom or landfill surface including adding a bentonite composition to an earthen surface of the lagoon or landfill wherein the bentonite composition includes bentonite, xanthan gum and at least one other water soluble gum so that contact of the bentonite composition with salt contaminated water does not substantially inhibit the water-sealing properties of the bentonite so that the bentonite can seal the lagoon bottom or landfill surface upon contact with the salt contaminated water.

DETAILED DESCRIPTION OF THE INVENTION

It has been found that the addition of xanthan gum in an amount of 0.1–20% based on the weight of water swellable montomorillonite clay, i.e. bentonite, together with the addition of at least one other water soluble gum in a total amount of 1–10% based on the weight of bentonite will enable bentonite to maintain its stability and permeability sealing properties when contacted with salt contaminated water. Neither xanthan gum nor the other water soluble gum when added alone will enable bentonite to maintain its stability and water-sealing properties when contacted with salt contaminated water. Surprisingly, it has been found that the addition of xanthan gum together with at least one other water soluble gum synergistically cooperate to enable the bentonite to maintain substantial stability and water-sealing properties when contacted with salt contaminated water.

The water-swellable colloidal clay utilized in the composition of present invention is any water swellable colloidal clay which will hydrate in the presence of water, i.e., will swell in the presence of fresh (non-contaminated) water. The most suprising results are obtained with the montmorillonite clays, i.e., bentonite, since these clays normally are substantially inhibited from swelling when contacted with salt contaminated water. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with the present invention may also contain other cations such as magnesium and iron.

There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like, i.e, 150 to 350 mesh.

The xanthan gum should be incorporated into the water swellable clay composition in an amount in the range of about 0.1 to about 20% based on the weight of the bentonite. Below about 0.1% based on the weight of water swellable clay, the xanthan gum will not synergistically cooperate with the other water swellable gum to enable the clay to maintain its stability and water-sealing ability in salt contaminated water. To achieve the full advantage of the present invention, the xanthan gum should be included in an amount in the range of about 0.2 to about 1% based on the weight of the water swellable clay. It has been found that xanthum gum, when included in the composition in an amount of about 0.2 to 0.22% based on the weight of bentonite, most effectively cooperates with the additional water soluble gum in the composition to enable the water swellable clay to maintain its stability and water-sealing properties in salt contaminated water. Generally, xanthan gum quantities greater than about 1% do not add significantly to the bentonite stability, however, additional quantities of xanthan gum in the range of 1–20% based on the weight of bentonite do not interfere with the bentonite water-sealing and stability properties but simply are not economically justified.

Xanthan gum is a high-molecular-weight natural polysaccharide and any xanthan gum can be incorporated into the water swellable clay composition in accordance with the present invention. One commercially available xanthan gum found to be particularly useful in accordance with the principles of the present invention is that designated as KELZAN XC manufactured by Kelco, a Division of Merck and Company, Inc. and is a xanthan gum which is pyruvic acid free produced by anaerobic fermentation of xanthomonas campestris microorganisms, as described in the Wernau U.S. Pat. Nos. 4,340,678 and 4,352,741.

At least one additional water soluble gum is necessary in cooperation with the xanthan gum to enable the water swellable clay in the composition to be unexpectedly stable and effective in sealing earthen formations and surfaces when contacted with salt contaminated water. Suitable water soluble gums include guar gum, dextran gum, acacia gum, locust bean gum and the like. This additional water soluble gum should be included in the composition in an amount in the range of about 1 to about 10% based on the weight of the water swellable clay. Below about 1% of this additional water soluble gum, complete synergistic cooperation with the xanthan gum is not experienced so that a substantial portion of the water swellable clay in the composition is coagulated or flocculated from the composition upon contact with salt contaminated water. Above about 10% of the additional water soluble gum, based on the weight of the water swellable clay, the composition may become too viscous, in a form similar to a spackling compound so that the composition is not workable, for example as a drilling fluid additive or in a lagoon or landfill application. However, additional quantities of the water soluble gum, i.e. guar gum, up to about 30–40% based on the weight of bentonite may be included provided that the composition remains workable for the intended purpose.

In order to show the synergistic cooperation between the xanthan gum and an additional water soluble gum, such as guar gum, various compositions were formulated by including bentonite in amounts typically used in drilling fluid additive compositions (18–24 lbs. per barrel) mixed with sea water having varying amounts of sodium chloride contamination to show the stability of the bentonite composition with guar gum alone, xanthan gum alone and with the combination of guar gum and xanthan gum in specified percentages. As shown in the following Table I, guar gum alone added to bentonite in an amount of 6.8% based on the weight of bentonite, when subjected to shearing at various shear rates to provide a bentonite/guar composition having indicated viscosities, began to separate upon standing. The separation indicates that the bentonite began to flocculate and settle to the bottom of the container. This floc was measured in inches after 1 and 3½ hours and indicated that the guar gum alone was not effective as a water-sealing composition when contacted with salt contaminated water.

TABLE 1

| Bentonite and 6.8%* guar gum alone 3.86% NaCl water | | | | | | | | |
|---|---|---|---|---|---|---|---|---|
| Bentonite quantity (pounds/ barrel) | Shear Rate/Resulting Viscosity (r.p.m.) (dynes/cm²) | | | | | | Separation Upon Standing (inches) | |
| | | | | | | | 1 Hour | 3.5 Hour |
| 18 | 600/22.0 | 300/15.0 | 200/12.0 | 100/8.0 | 6/1.0 | 3/0.05 | 2.5 | 3 |
| 20 | 600/26.5 | 300/18.5 | 200/15.0 | 100/10.5 | 6/2.0 | 3/1.0 | 1.75 | 3 |
| 22 | 600/30.0 | 300/22.0 | 200/17.5 | 100/12.5 | 6/2.5 | 3/1.5 | .50 | 2.5 |
| 24 | 600/34.0 | 300/25.0 | 200/20.0 | 100/15.0 | 6/3.0 | 3/2.0 | .25 | 1 |

*percentage based upon the weight of bentonite

As shown in the following Table II, bentonite when mixed with 0.22% xanthan gum alone and contacted with the same water, containing 3.86% NaCl contamination began to floccculate immediately yielding a measurable ½ inch floculant settling to the bottom of the container in 5 minutes, and 1 inch of flocculant in 10 minutes, regardless of shearing and resulting viscosity.

guar gum and xanthan gum did not show signs of floc until about 24 hours with no measurable flocculant settling to the bottom of the container in that time period.

When bentonite alone was contacted with 3.86% NaCl seawater, without any gum additives, the bentonite began to flocculate immediately giving a ⅜ inch

TABLE II

| Bentonite and 0.22%* xanthan gum alone, 3.86% NaCl water | | | | | | | | |
|---|---|---|---|---|---|---|---|---|
| Bentonite quantity (pounds/ barrel) | Shear Rate/Resulting Viscosity (r.p.m.) (dynes/cm²) | | | | | | Separation Upon Standing (inches) | |
| | | | | | | | 1 Hour | 3.5 Hour |
| 18 | 600/6.0 | 300/3.0 | 200/25 | 100/1.5 | 6/— | 3/— | Imm. Floc ½ inch in 5 min. | 1 inch in 10 min. |
| 24 | 600/6.5 | 300/3.5 | 200/3.0 | 100/21.0 | 6/0.5 | 3/0.5 | Imm. Floc ½ inch in 5 min. | 1 inch in 10 min. |

*percentage based upon the weight of bentonite

As set forth in Table III, bentonite when combined with 6.8% guar gum and 0.22% xanthan gum based on the weight of bentonite and contacted with the same 3.86% NaCl contaminated water provided bentonite compositions at each given bentonite loading level which gave no measurable flocculant settling to the bottom of the container after 24 hours. Signs of flocculant began to develop after about 24 hours but no measurable settled floc appeared within this time period.

settled floc after 15 minutes, a 1 inch settled floc after 30 minutes, and a 2 inch floc after one hour.

I claim:

1. A method of drilling comprising contacting an earthen formation with a rotary drilling bit to form a salt contaminated drill hole and circulating a drilling fluid in said drill hole to cool and lubricate said drill bit during rotation and to lift drill cuttings out of said drill hole, wherein the drilling fluid becomes contaminated

TABLE III

| Bentonite, 6.8%* guar gum, and 0.22%* xanthan gum 3.86% NaCl water | | | | | | | | |
|---|---|---|---|---|---|---|---|---|
| Bentonite quantity (pounds/ barrel) | Shear Rate/Resulting Viscosity (r.p.m.) (dynes/cm²) | | | | | | Separation Upon Standing (inches) | |
| | | | | | | | 1 Hour | 3.5 Hour |
| 18 | 600/23.0 | 300/15.5 | 200/12.5 | 100/8.5 | 6/1.5 | 3/1.0 | No signs of floc formation until about 24 hours | |
| 20 | 600/28.0 | 300/19.5 | 200/15.5 | 100/11.0 | 6/2.0 | 3/1.5 | No signs of floc formation until about 24 hours | |
| 22 | 600/31.5 | 300/22.5 | 200/18.5 | 100/13.0 | 6/3.0 | 3/2.0 | No signs of floc formation until about 24 hours | |
| 24 | 600/36.0 | 300/25.5 | 200/21.0 | 100/15.0 | 6/4.0 | 3/3.0 | No signs of floc formation until about 24 hours | |
| **22 | 600/31.5 | 300/22.0 | 200/18.0 | 100/12.5 | 6/2.0 | 3/1.5 | No signs of floc formation until about 24 hours | |

*percentages based upon the weight of bentonite
**26% NaCl water

As set forth in the above Table III in the last row of data, a bentonite composition at a bentonite concentration of 22 pounds of bentonite per barrel was contacted with a highly contaminated salt water containing 26% NaCl and, even at this extremely high salt contamination level, the bentonite composition containing both with salt contaminated water, the improvement comprising adding a water swellable montmorillonite clay composition to said drilling fluid said composition comprising a water swellable montmorillonite clay, xanthan gum in an amount of 0.1% to 20% based on the weight of water swellable montmorillonite clay, and at least one other, water soluble gum selected from the group consisting of guar gum, dextran gum, locust bean gum, and mixtures thereof in an amount of 4.0% to 10% based on the weight of water swellable clay.

2. The method of claim 1 wherein the xanthan gum is included in an amount of about 0.2 to 1.0% based on the weight of water swellable clay.

3. The method of claim 1 wherein the clay is bentonite.

4. The method of claim 1 wherein the other water soluble gum is guar gum.

* * * * *